No. 766,315. PATENTED AUG. 2, 1904.
J. W. ARTHUR.
PLANT CHOPPER OR CUTTER.
APPLICATION FILED APR. 1, 1903.
NO MODEL. 4 SHEETS—SHEET 4.
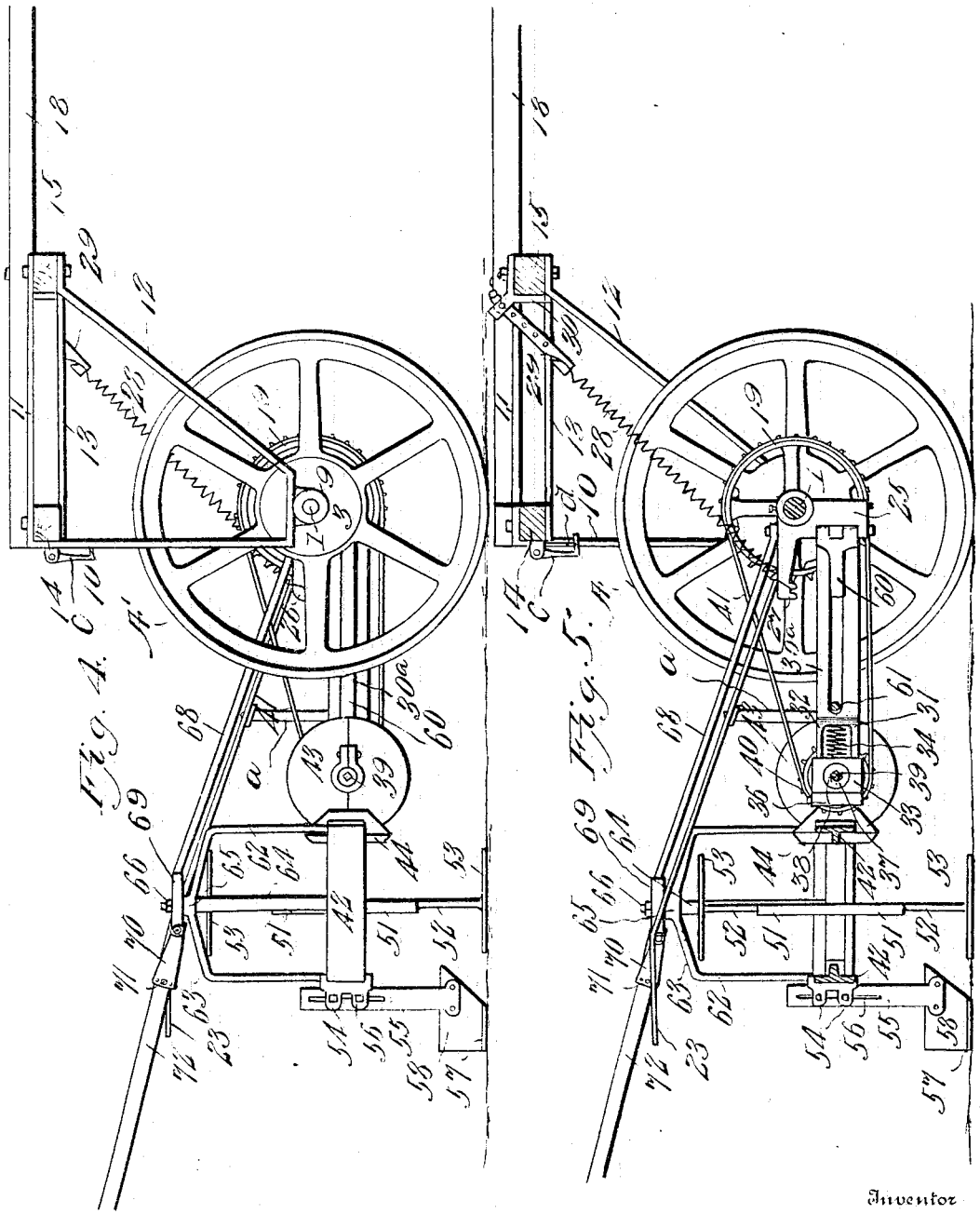
Witnesses
Inventor
James W. Arthur,
By Victor J. Evans
Attorney No. 766,315. Patented August 2, 1904.

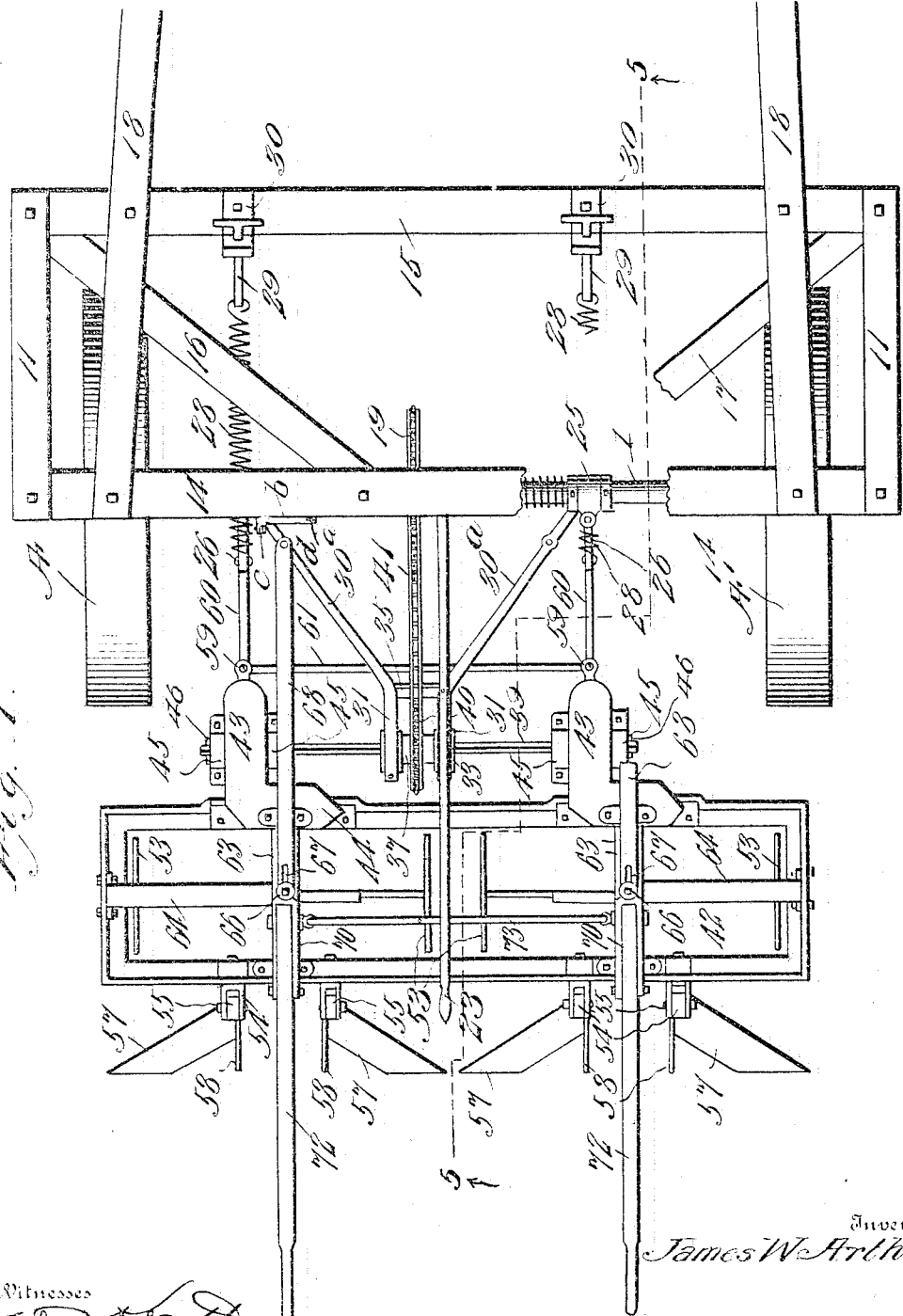

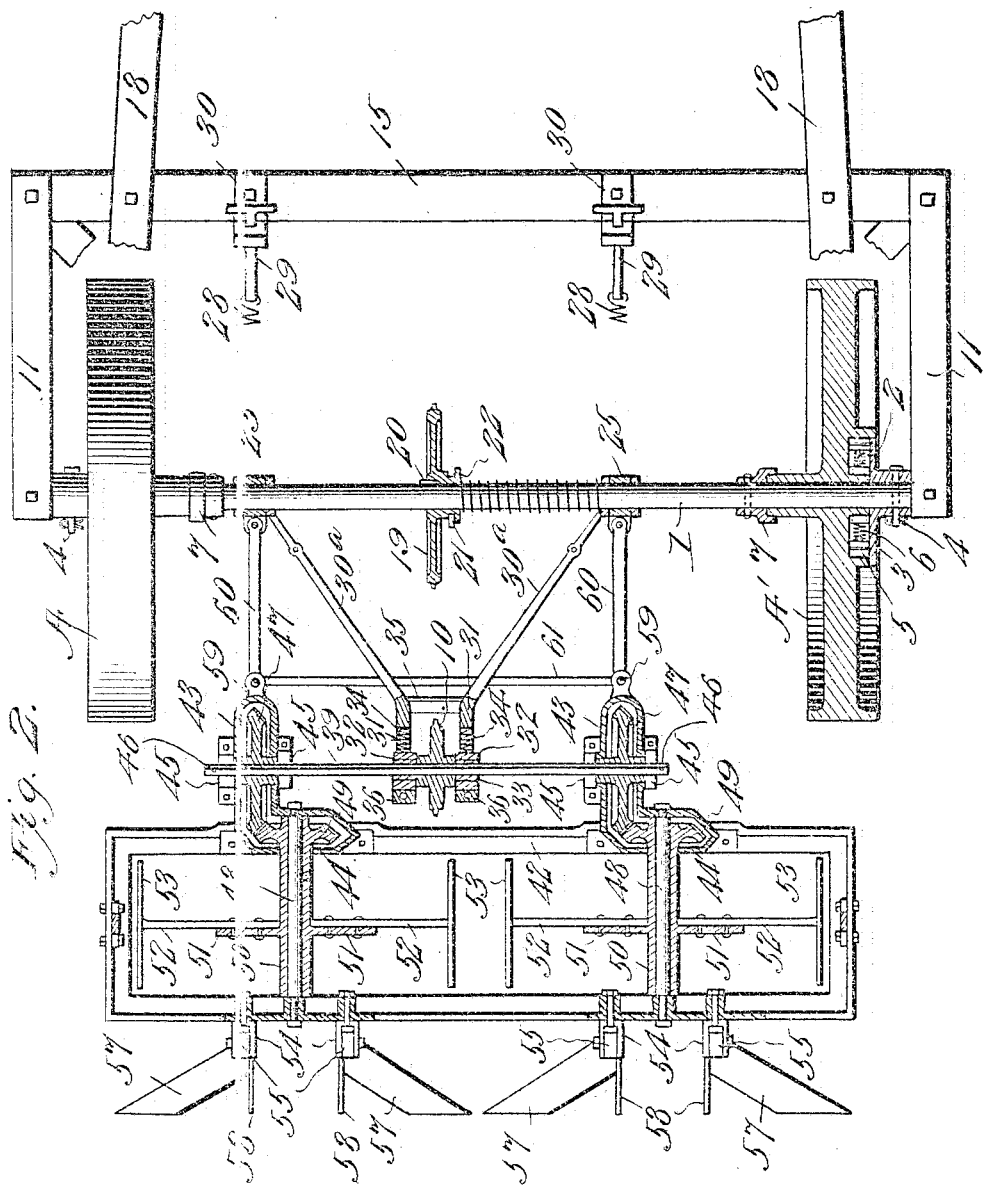

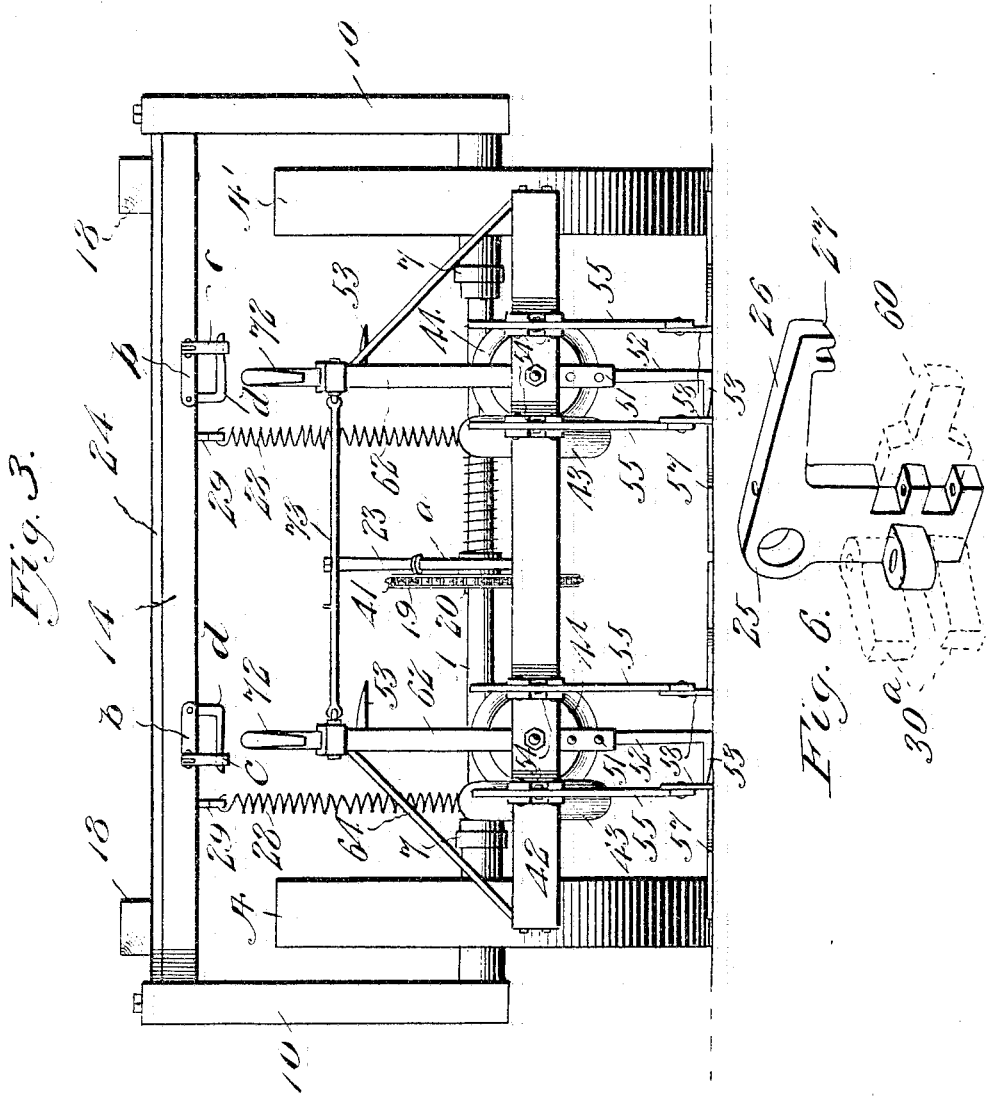

UNITED STATES PATENT OFFICE.

JAMES W. ARTHUR, OF DENVER, COLORADO, ASSIGNOR OF ONE-HALF TO ALBERT LEWIN, OF DENVER, COLORADO.

PLANT CHOPPER OR CUTTER.

SPECIFICATION forming part of Letters Patent No. 766,315, dated August 2, 1904.

Application filed April 1, 1903. Serial No. 150,630. (No model.)

*To all whom it may concern:*

Be it known that I, JAMES W. ARTHUR, a citizen of the United States, residing at Denver, in the county of Arapahoe and State of Colorado, have invented new and useful Improvements in Plant Choppers or Cutters, of which the following is a specification.

My invention has relation to improvements in plant-topping machines, and is chiefly designed for use in blocking out the rows of beet-plants, so that the remaining plants will stand at certain and determined distances apart and the work of thinning down the uncut plants will be greatly expedited.

While the invention as shown and described is particularly adapted for chopping off the growing tops of beet-plants, it is apparent that it is equally useful in thinning out similarly-growing crops, such as parsnips, carrots, and turnips.

The invention consists in the construction and arrangement of parts which will be more fully hereinafter set forth.

I have fully and clearly illustrated the improvements in the annexed drawings, forming a part of this specification, and wherein—

Figure 1 is a top plan view of the machine, the rear rail of the frame being broken away to show the connection of the sprocket-frame to the casting on the driving-axle. Fig. 2 is a plan view, partly in horizontal section. Fig. 3 is a rear elevation of the machine. Fig. 4 is a side elevation of the machine. Fig. 5 is a longitudinal section taken on the line 5 5 of Fig. 1. Fig. 6 is a detail view showing the connections of the rear sprocket-frame and the swinging bars to the hangers or brackets on the axle.

In the drawings similar parts appearing in the several illustrations are designated by like reference characters.

Referring to the drawings, A A' designate the driving-wheels, carrying the axle 1, which constitutes the driving means for the mechanisms to be hereinafter described. The wheels have their hubs loosely mounted on the axle, but are held rigid therewith in the forward movement by any means which will automatically be disengaged when the forward revolution is reversed, so that in turning the machine around the outer wheel will proceed in its revolution uninterrupted, while the inner wheel will be free from its engagement with the axle and stand approximately still. To effect this differential relation of the wheels while the machine is being turned around, the wheels are formed with a circular channel or chamber 2, (see Fig. 2,) having its outer wall formed with ratchet-teeth, and close the chamber with a disk 3, the hub of which is mounted on the axle and rigidly secured thereto by a linchpin 4, passed through the axle and hub. To the inner face of the disk 3 are hung a requisite number of pawls 5, the free ends of which engage the ratchet-teeth in the wall of the chamber 2 in the forward movement of the machine. The pawls are held in engagement by springs 6, substantially as shown. The disk 3, being secured to the axle, as stated, keeps the wheel from outward movement on the axle, while its inner displacement is prevented by a collar 7, rigidly secured on the axle and formed with an annular end flange which overhangs the inner end of the wheel-hub and serves to prevent the displacement of the hub in that direction and to keep the dust from reaching the spindles.

The ends of the axle project beyond the outer ends of the disk-hubs, the projecting ends being reduced, as indicated at 8 in Fig. 4, and thereon are mounted frames or brackets, duplicates in form and construction and consisting of bearing-pieces 9, which constitute the supports for the frames. From the rear end of the supports 9 rise vertical standards 10, which at their upper ends are extended in horizontal direction a desired and determined distance, as at 11. From the forward ends of the supports 9 extend upwardly-directed brace rods or bars 12, to the upper ends of which are secured or made integral therewith rearwardly-extending horizontal bars or plates 13, disposed below and in alinement with the bars 11. Between the bars 11 and 13 at the rear ends are secured the ends of the rear cross rail or sill 14, and at the front between said bars are secured the ends of the front cross-rail 15. The frame is braced additionally by brace-rods 16 17, running from the middle of the cross-rail 14 to the corner intersections of the end frames and the front rail 15. The shafts or thills 18 have their rear portions secured to the rails 14 and 15 substantially as indicated in the drawings. It will be readily perceived that instead of shafts a tongue may be used, so that two animals instead of one will constitute the power, and for the purpose of connecting the power a swingletree, or two of them, can be hung to the front rail 15 in any well-known manner.

19 designates the driving-sprocket, having its hub slidably mounted on the axle 1 and held rigid with the axle by means of a spline or rib 20 engaging detachably with a coincident groove cut in the inner face of the hub. The hub is formed at one end with an annular channel 21, which is engaged by the forked end or collar 22 of a lever 23, fulcrumed to the rear sprocket-carrying frame on a vertical support $a$, so as to have a lateral swing on the support, the lever being extended rearward, as shown, to be conveniently manipulated from the rear end of the machine, so as to lock the lever in either position of holding the hub in engagement with the spline or holding it free and loose on the axle.

Because the chopping or blocking mechanism for topping the plants extends well to the rear of the supporting or driving axle, it is necessary that suitable means be provided to sustain and counterbalance this weight and cause the weeders and rotatable choppers to cut evenly and to a proper depth. I accomplish this desired condition by the following-described constructions and elements or mechanism: On the driving-axle are pivotally hung bracket-castings 25, held against lateral displacement by collars, as shown. These brackets are formed with perforated ears at their front and sides (see Fig. 6) to receive the ends of the swinging bars and the bars of the rear sprocket-frame, as hereinafter specified. At the upper ends of the brackets 25 are formed rearwardly-extending arms 26, terminating in hooked ends 27, wherein is engaged the ends of contractile suspension-springs 28, the other ends of which are connected to the hooked ends of longitudinally-adjustable bars 29, slidably arranged in the stems of Y-brackets 30, secured to the cross-rail 14, as seen in the drawings. Pins $29^a$ are projected through the stems of these brackets and perforations $29^b$ in the bars 29 to hold the bars in any position to which the tension adjustment may require. The bars 29 are provided with handles by which to operate them. It will be perceived that by the pull or tension of the springs 28 a force is exerted tending to turn or swing the brackets 25 on the axle, and through the connection of the arms 26 and their relation to the brackets, of which they form a part to the associated mechanism, the dead-weight of the blocking and weeding mechanism is relieved or counterbalanced. To the inner hinge-ears of the castings 25 are pivotally bolted the bars $30^a$ of the rear sprocket-frame. (See Fig. 6.) These frame-bars consist of strong upper and lower bars converging toward each other from their connections to the castings 25, as shown, and have their rear end portions, as 31, directed parallel with each other and formed with alining box-housings 32, wherein are disposed boxes 33, between which and the inner ends of the box-housings are placed buffer-springs 34, which act to press the boxes always in proper position and at the same time permit them to have a limited yielding movement in the housings toward the axle to compensate for any forward yield of the rear sprocket-wheel shaft caused by the pull of the sprocket-chain. The arms or bars $30^a$ at the commencement of the parallel extensions 31 are connected by a cross-piece 35, and the upper and lower bars of the box-housings at the rear ends have end pieces 36 strongly but removably secured thereto, against which the boxes 33 normally stand. In the boxes 33 are formed bearing-apertures wherein is journaled a sleeve 37, formed with a central square passage 38, extending lengthwise therethrough to receive the square shaft 39. On the sleeve 37, at the middle thereof, is mounted the rear sprocket-wheel 40, or this wheel may be made integral with the sleeve. On the sprocket-wheel 40 is arranged the driving-chain 41, which is carried about the driving-sprocket 19, as shown.

42 designates a rectangular metal frame, made preferably of T-iron, arranged with the stem of the T turned inward, as shown, which frame carries the plows or blades constituting the weeders and the revolving choppers or blockers and the mechanism for actuating the latter. To the front rail of this frame at a determined distance apart are mounted and firmly secured two casings or housings 43, made in two parts secured together in any suitable manner and having lateral extensions 44, the whole casing being formed and designed to take in, cover, and protect the miter or bevel gears working therein. The main and forwardly-extending sections or parts of these housings are formed with alining bearings wherein are arranged bearing-collars 45, secured and held against outward displacement by fastenings, as pins 46, projected through the square shaft, which is extended through the bearing-collars, as shown. On the square shaft 39, within the housings between the bearing-collars, are mounted the bevel gear-wheels 47. (See Fig. 3.)

48 designates round bearing-shafts arranged across the rectangular frame 42 and held in fixed position by having one end passed through the rear rail of the frame and clamped by a nut on the projecting end and the other end passed through the lateral extension of the housings and rigidly held in the front wall of the housing by any suitable means. On the fixed shafts 48 are revolubly mounted the bevel-gears 49 within the lateral extensions of the housings and in mesh with the bevel-gears 47. The hubs of the bevel-gears 49 are elongated into sleeves 50, which are formed with radial arms 51, having edge flanges, as indicated in the drawings, and in the seats or channels thus formed in the radial arms are disposed and secured the stems 52 of the blocker or chopping blades or knives 53. The cutting-blades of the choppers are made of such length as to cut out a block of the plants and leave the standing plants at the desired distances apart. The cutting-blades of the choppers are arranged to stand at about right angles to their stems, and, as indicated in the drawings, they cut through and across the rows of standing plants at stated intervals and distances on planes parallel with the surface. To the rear rail of the rectangular frame 42 at determined distances apart are secured ears 54, provided with cross-bolts, as shown, and between these ears are adjustably arranged the vertical standards 55, which for the purposes of vertical adjustment are formed with vertical slots 56, which take on the cross-bolts in the ears 54, so that when the bolts are clamped up the standards will be held in the position to which they have been adjusted. To the lower ends of the standards are suitably secured the weeding blades or plows, consisting of angularly-shaped blades 57, disposed to lie flat on the surface with their front cutting edges at a shearing angle and at their inner ends are turned up vertically, as at 58, thus shielding the plants from being knocked down by the progress of the machine.

It will be perceived by reference to the illuustrations that the weeders are arranged to straddle the rows of plants and that the inner set are designed to cut clear across between rows.

On the front ends of the housings 43 are formed ears 59, to which one end of bars 60 are pivotally bolted, the other ends being similarly connected to the castings 25, substantially as shown, and to make the bars 60 move synchronously their rear ends are connected by a cross-rod 61, held in position by the same bolts which secure the rods to the ears 59.

At the proper positions on the rectangular frame 42 are mounted vertically-arranged frames 62, duplicates in construction, and consisting of opposite vertical standards having their lower ends suitably secured to the frame and their upper ends integrally connected by an arch or bridge-piece 63. The frames are braced against outward displacement by means of brace-pieces 64, having their lower ends secured to the end pieces of the rectangular frame and their upper ends secured to the middle of the bridge or arch of the frames, as shown.

At the middle of the bridge-pieces are formed short vertical extensions 65, having screw-threaded stems 66, which take through slots 67 in the handle-bars or braces 68. These handle-bars 68 consist of metal rods or bars having their forward ends secured to the bars 30ª and thence rising at an incline and are formed with a horizontal portion 69, lying flat on the extension 65, with the threaded stem projecting through the slot 67 and clamped fast by nuts on said stems. Secured to the rear end of the handle-bars or formed integral therewith are alining sector-shaped plates 70, provided with a series of pinholes 71, the lower ends of the handles 72 being placed between said plates 70 and held against inward movement by a bar 73, having its ends formed with eyes through which staples or eyes engage, as shown. This bar 73, with the limited movement of its loose staple connections, provides a limited lateral movement of each handle, as indicated in the drawings. The handles are pivotally supported in this manner in the sector-plates and may be adjusted by means of pins passed through the sector-plate and the handles, so that the handles may be adjusted in height at their rear ends by means of the pins being passed through the proper pinhole in the sector-plate, as indicated in Figs. 1, 4, and 5 of the drawings. To provide means whereby the whole chopping mechanism may be carried in elevated tilted condition, as may be required, I fasten to the inner face of the cross-rail 14 a plate $b$, to one end of which is pivotally hung a latch $c$, and to the other end of the plate $b$ is pivotally secured an angular latch-bar $d$, the free end of which is adapted to lodge in and rest on the lower end of the catch $c$, substantially as shown in the drawings. It will readily be perceived that when the latch is opened the machine may be tilted forward until the bars 68 enter between the latch members and that then the latch may be engaged with the catch and the chopping mechanism will be held free from the ground.

The utilization of the machine and the mode of operation are apparent. The progression of the wheels communicates rotation to the revoluble elements to accomplish the objects, and the action of the weeders is a sequence of the progression.

Having thus fully described the invention, what is claimed as new is—

1. In a plant-topping machine, the combination with the driving axle and frame and topping mechanism, of brackets pivotally hung on the axle and formed with rearwardly-extending arms, tension-springs connected to the arms, bars secured to the other ends of the springs and engaging brackets mounted on the frame and means for adjusting the bars with relation to the brackets.

2. In a plant-topping machine, the combination with the axle and the frame carried thereon and topping mechanism, of brackets pivotally hung on the axle and formed with rearwardly-extending arms, the chopping mechanism being connected to the brackets, tension-springs having one end connected to the arms, bars secured to the other ends of the springs and slidingly disposed in brackets mounted on the frame, and fastening-pins to hold the bars in adjusted position.

3. In a plant-topping machine, the combination with the driving-axle, the frame carried thereon, and the blocking mechanism, of brackets pivotally hung on the axle and formed with rearwardly-projecting arms, tension-springs having one end connected to the said arms, slidable bars having one end connected to the springs and formed with handles to draw the bars lengthwise, keepers through which the bars are slidably arranged, and pins projected through the keepers and bars to hold the bars in adjusted position.

4. In combination with the carrying-wheels and the axle turned thereby, of brackets pivotally hung on the axle, bars pivotally connected to the brackets, housings pivotally connected to the rear ends of said bars, a sprocket-carrying frame, a square shaft projected through the sprocket-carrying frame, and the housings and provided with bearings therein, bevel gear-wheels on the square shaft within the housings, a rectangular frame at the rear of the housings, fixed shafts mounted across the frame, bevel-pinions loosely journaled on the fixed shafts and having their hubs extended approximately the length thereof and formed with radial arms, blocker-knives secured to the radial arms, a sprocket-wheel on the square shaft in the sprocket-carrying frame, a sprocket-wheel on the driving-axle, and a chain on the sprockets.

5. A plant-topping machine, comprising carrying-wheels, an axle carried and turned thereby, brackets hung on the axle, bars pivotally connected to the brackets, housings pivotally connected to the rear ends of said bars, a sprocket-carrying frame comprising converging bars having their front ends connected to said brackets and their rear ends extended parallel with each other, bearings in the sprocket-frame, and the housings, bevel gear-wheels in the housings, a sprocket-wheel carried by the sprocket-frame, a shaft projected through and made fast in the said bearings, a frame at the rear of the housings and secured thereto, fixed shafts mounted across the frame, bevel-pinions loosely journaled on the fixed shafts and having their hubs extended for the length thereof and formed with radial arms, blocker-knives secured to the radial arms, pairs of weeding-blades secured to the rear bar of the said frame arranged to straddle the rows of plants, a sprocket-wheel on the driving-shaft within the sprocket-carrying frame, a sprocket-wheel on the axle, and a chain on the sprockets.

6. The combination with the driving-axle, of a frame, a longitudinally-movable boxing on the frame, means to force said boxing in one direction, a counter-shaft journaled in the boxing, a chopper mechanism pivoted to the axle, means to drive the shaft from the axle and means to drive the said mechanism from the counter-shaft.

7. The combination with the axle, the frame, the chopper mechanism, and means for adjusting the height of said mechanism, of handle-bars pivoted to the axle and connected to said mechanism, handles pivoted to said bars, and means for adjusting the handles with relation to said mechanism.

8. The combination with the axle, of a frame, comprising oppositely-arranged members formed with alining box-housings, boxings longitudinally movable in said housings, springs to force the boxings in one direction, a counter-shaft journaled in the boxings, chopper mechanism pivoted to the axle, means to revolve the shaft from the axle and means for operating said mechanism from the counter-shaft.

9. In a plant-topping machine, the combination with the axle of a rectangular frame pivoted for vertical and horizontal movement, choppers on the frame, vertical frames arranged on the frame at the ends thereof, braces connecting the said frames, and vertically-adjustable handles at the upper portions of the vertical frames.

10. In a plant-topping machine, the combination with the axle, of a frame, a boxing longitudinally movable in the frame, means to force the boxing in one direction, a counter-shaft journaled in the boxing at a point intermediate its ends and carrying gears at its opposite ends, a frame carrying shafts each of which is provided with a gear meshing with the gears on the ends of the shaft respectively, plant-choppers carried by the shafts on the frame and means to drive the counter-shaft from the axle.

11. In a plant-topping machine, the combination with the axle, of a frame, a boxing longitudinally movable yieldingly mounted on the frame, a counter-shaft journaled in the boxing at a point intermediate its ends, said shaft being parallel to the axle, and having gears on its opposite ends, and choppers journaled on the frame and driven by said gears.

12. In a plant-topping machine, the combination with the axle of a rectangular frame pivoted for horizontal and vertical movement, gear-casings mounted on the frame, a counter-shaft journaled in the casings and parallel to the axle, shafts within the frame carrying chopping means extending longitudinally of the frame and having one end journaled within the casing, gearing for transmitting motion from the axle to the counter-shaft and gearing within the casings for transmitting motion from the counter-shaft to the shafts for the chopping means.

In testimony whereof I affix my signature in presence of two witnesses.

JAMES W. ARTHUR.

Witnesses:
    JOHN M. CLAY,
    ALBERT NEUMAN.